United States Patent
Cao et al.

(10) Patent No.: US 10,404,609 B2
(45) Date of Patent: Sep. 3, 2019

(54) METHOD FOR DELAYING SIGNAL TRANSMISSIONS FROM A DEVICE UNDER TEST (DUT) BY TRANSMITTING CONGESTIVE COMMUNICATION CHANNEL SIGNALS

(71) Applicant: LitePoint Corporation, Sunnyvale, CA (US)

(72) Inventors: Chen Cao, Sunnyvale, CA (US); Christian Volf Olgaard, Saratoga, CA (US); Ruizu Wang, Santa Clara, CA (US)

(73) Assignee: LitePoint Corporation, Sunnyvale, CA (US)

( * ) Notice: Subject to any disclaimer, the term of this patent is extended or adjusted under 35 U.S.C. 154(b) by 69 days.

(21) Appl. No.: 15/842,407

(22) Filed: Dec. 14, 2017

(65) Prior Publication Data

US 2019/0190840 A1    Jun. 20, 2019

(51) Int. Cl.
*H04L 12/26* (2006.01)
*H04L 12/841* (2013.01)
*H04L 12/825* (2013.01)

(52) U.S. Cl.
CPC ............ *H04L 47/283* (2013.01); *H04L 43/10* (2013.01); *H04L 47/26* (2013.01)

(58) Field of Classification Search
CPC ........ H04L 47/283; H04L 47/26; H04L 43/10
USPC .................................................. 370/217–258
See application file for complete search history.

(56) References Cited

U.S. PATENT DOCUMENTS

| | | | | |
|---|---|---|---|---|
| 5,838,694 A * | 11/1998 | Illes | .................. | G01R 31/31921 714/738 |
| 5,894,484 A * | 4/1999 | Illes | .................... | G01R 31/2834 712/2 |
| 7,117,126 B2 * | 10/2006 | Floyd | ........................ | H04L 1/24 702/186 |
| 10,126,374 B2 * | 11/2018 | Novak | .................... | G01R 31/40 |
| 2006/0206280 A1 * | 9/2006 | Reis | ................ | G01R 31/318533 702/124 |
| 2009/0044057 A1 * | 2/2009 | Choate | ................ | G06F 11/2236 714/40 |
| 2009/0044058 A1 * | 2/2009 | Choate | ................ | G06F 11/2236 714/40 |
| 2009/0079462 A1 * | 3/2009 | Lee | ..................... | G01R 31/2889 324/762.01 |
| 2009/0296797 A1 * | 12/2009 | Wei | ......................... | H04L 1/244 375/228 |
| 2011/0292809 A1 | 12/2011 | Olgaard et al. | | |
| 2012/0045998 A1 * | 2/2012 | Hsiao | ................. | H04B 17/0085 455/67.14 |
| 2012/0232827 A1 * | 9/2012 | Hsu | ....................... | H01R 43/205 702/122 |
| 2013/0028100 A1 | 1/2013 | Olgaard | | |
| 2013/0326274 A1 | 12/2013 | Olgaard et al. | | |

(Continued)

*Primary Examiner* — Thai D Hoang
(74) *Attorney, Agent, or Firm* — Fountainhead Law Group P.C.

(57) ABSTRACT

A method for testing a data packet signal transceiver device under test (DUT). Following initial signal communications with a DUT, timing of further transmissions by the DUT may be effectively controlled by transmitting congestive communication channel signals to cause the DUT to detect apparent communication channel activity and in response thereto delay its own signal transmissions.

15 Claims, 4 Drawing Sheets

(56) References Cited

U.S. PATENT DOCUMENTS

2014/0266238 A1* 9/2014 Furse ................. G01R 31/2841
                                                    324/533
2015/0078196 A1   3/2015 Olgaard
2016/0352611 A1  12/2016 Olgaard
2017/0118106 A1*  4/2017 Yeh ......................... H04L 43/50

* cited by examiner

METHOD FOR DELAYING SIGNAL TRANSMISSIONS FROM A DEVICE UNDER TEST (DUT) BY TRANSMITTING CONGESTIVE COMMUNICATION CHANNEL SIGNALS

BACKGROUND

The present invention relates to testing of wireless devices, and in particular, to controlling timing of transmissions by a data packet signal transceiver device under test (DUT) by transmitting congestive communication channel signals to cause the DUT to detect apparent communication channel activity and delay its own signal transmissions.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

Testing of such wireless devices typically involves testing of the receiving and transmitting subsystems of the device under test (DUT). The testing system will send a prescribed sequence of test data packet signals to a DUT, e.g., using different frequencies, power levels, and/or signal modulation techniques to determine if the DUT receiving subsystem is operating properly. Similarly, the DUT will send test data packet signals at a variety of frequencies, power levels, and/or modulation techniques for reception and processing by the testing system to determine if the DUT transmitting subsystem is operating properly.

For testing these devices following their manufacture and assembly, current wireless device test systems typically employ testing systems having various subsystems for providing test signals to each device under test (DUT) and analyzing signals received from each DUT. Some systems (often referred to as "testers") include, at least, one or more sources of test signals (e.g., in the form of a vector signal generator, or "VSG") for providing the source signals to be transmitted to the DUT, and one or more receivers (e.g., in the form of a vector signal analyzer, or "VSA") for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

Referring to FIG. 1, a typical testing environment 10a includes a tester 12 and a DUT 16, with test data packet signals 21t and DUT data packet signals 21d exchanged as RF signals conveyed between the tester 12 and DUT 16 via a conductive signal path 20a, typically in the form of co-axial RF cable 20c and RF signal connectors 20tc, 20dc. As noted above, the tester typically includes a signal source 14g (e.g., a VSG) and a signal analyzer 14a (e.g., a VSA). The tester 12 and DUT 16 may also include preloaded information regarding predetermined test sequences, typically embodied in firmware 14f within the tester 12 and firmware 18f within the DUT 16. The testing details within this firmware 14f, 18f about the predetermined test flows typically require some form of explicit synchronization between the tester 12 and DUT 16, typically via the data packet signals 21t, 21d. Alternatively, testing may be controlled by a controller 30 which may be integral to the tester 12 or external (e.g., a programmed personal computer) as depicted here. The controller 30 may communicate with the DUT 16 via one or more signal paths (e.g., Ethernet cabling, etc.) 31d to convey commands and data. If external to the tester 12, the controller 30 may further communicate with the tester 12 via one or more additional signal paths (e.g., Ethernet cabling, etc.) 31t to convey additional commands and data.

Referring to FIG. 2, an alternative testing environment 10b uses a wireless signal path 20b via which the test data packet signals 21t and DUT data packet signals 21d may be communicated via respective antenna systems 20ta, 20da of the tester 12 and DUT 16.

Ordinarily when testing a wireless device (e.g., wireless fidelity (WiFi), Bluetooth, Zigbee, Z-Wave or similar device) with a tester, once communications between tester and DUT have been established, the tester and DUT will execute a test flow during which the tester or controller controls the behavior of the DUT (e.g., by executing control commands via driver software associated with the DUT). Commands may include instructing the DUT to receive test packets from the tester, or to transmit packets to the tester. The characteristics of the packets may also be controlled, such as power level, frequency, data rate, modulation, etc.

However, for some types of DUTs, such as Internet-of-Things ("IoT") sensors or wearable devices, direct external control of the DUT may not be practical or possible. In such cases, testing must typically be performed by the tester interacting directly with the DUT, e.g., with strict synchronization between the tester and DUT via only a wired 20a or wireless 20b signal path for the communication channel with no dedicated signal paths 31b for control signals. However, as these DUTs are usually based on real application stacks, they follow specific timing manners and are impossible to wait for the tester.

Referring to FIG. 3, for example, following an initial communication from the tester, the DUT may respond during a subsequent time interval 42 with a packet 21da (e.g., an acknowledgement, or "ACK") for capture and processing (e.g., storage, analysis, etc.) by the tester. Meanwhile, as the tester begins operating in a pre- or post-processing mode 44 with the received packet 21da, the DUT may continue (e.g., with a sequence of asynchronous operations independent of other external stimuli, or with a sequence of synchronous operations in response to the initial tester communication) by transmitting further packets 21db, 21dc, which may be missed by the tester, e.g., during the processing interval 44 or later due to a subsequent tester capture and response time interval 46 starting after transmission of a DUT packet 21dc has been initiated. Such missed DUT packets 21db, 21dc could result in the tester failing to catch up and/or keep pace with the DUT, in terms of capturing further DUT packets, as well as the DUT assuming that its communication link with the tester has failed or been otherwise lost, and thereby likely result in a failed test or at least an incomplete test.

Therefore, for a robust test of the DUT under its expected operating conditions, the processing capabilities of the tester would need to be sufficiently high to ensure completion in time to capture all subsequent DUT packets. Such a level of tester performance, in terms of processing speeds, is significantly higher than what is normally sufficient (e.g., as when the tester is allowed to control the rate of test operations) and results in significantly increased test equipment costs.

SUMMARY

A method for testing a data packet signal transceiver device under test (DUT). Following initial signal communications with a DUT, timing of further transmissions by the DUT may be effectively controlled by transmitting congestive communication channel signals to cause the DUT to detect apparent communication channel activity and in response thereto delay its own signal transmissions.

In accordance with an exemplary embodiment of the presently claimed invention, a method for testing a data packet signal transceiver device under test (DUT) includes: receiving, via a communication channel, a DUT data packet signal from a DUT; responding to said DUT data packet signal by transmitting, via said communication channel, a test data packet signal including first identification data related to said test data packet signal; following said responding, further transmitting, via said communication channel, at least one of said test data packet signal, or a channel signal excluding said first identification data and congesting at least a portion of said communication channel; concurrently with at least a portion of said further transmitting, processing said received DUT data packet signal; and terminating said further transmitting.

In accordance with another exemplary embodiment of the presently claimed invention, a method for testing a data packet signal transceiver device under test (DUT) includes: receiving, via a communication channel, a DUT data packet signal from a DUT; responding to said DUT data packet signal by transmitting, via said communication channel, a test data packet signal including first identification data related to said test data packet signal; processing said received DUT data packet signal while at least partially concurrently further transmitting, via said communication channel, at least one of said test data packet signal, or a channel signal excluding said first identification data and congesting at least a portion of said communication channel; and terminating said further transmitting.

In accordance with another exemplary embodiment of the presently claimed invention, a method for testing a data packet signal transceiver device under test (DUT) includes: conveying during each one of a first plurality of time intervals, via a communication channel, a respective one of a plurality of DUT data packet signals from a DUT; conveying during each one of a second plurality of time intervals, via said communication channel, a respective one of a plurality of test data packet signals responsive to a corresponding one of said plurality of DUT data packet signals and including first identification data related to at least a portion of said plurality of test data packet signals; and during each one of a third plurality of time intervals, processing a respective one of said plurality of DUT data packet signals while at least partially concurrently further conveying, via said communication channel, at least one of said test data packet signal, or a respective one of a plurality of channel signals excluding said first identification data and congesting at least a portion of said communication channel; wherein each one of said second plurality of time intervals follows a respective one of said first plurality of time intervals, each one of said third plurality of time intervals follows a respective one of said second plurality of time intervals, and each one of at least a portion of said third plurality of time intervals is followed by a subsequent respective one of said first plurality of time intervals.

DETAILED DESCRIPTION

Figure 1:
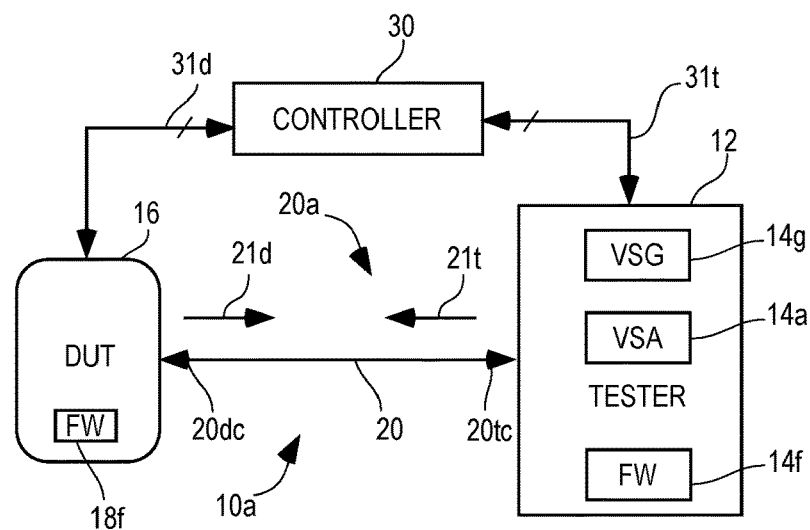
FIG. 1 depicts a typical testing environment for a radio frequency (RF) data packet signal transceiver device under test (DUT) in a conductive, or wired, environment.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies, such as IEEE 802.11a/b/g/n/ac ("WiFi"), 3GPP LTE, Bluetooth, Zigbee, Z-Wave, etc. The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and one or more transmitters. Thus, the tests are intended to confirm whether the receivers and transmitters both conform. Tests of the receiver(s) of the DUT (RX tests) typically involve a test system (tester) sending test packets to the receiver(s) and some way of determining how the DUT receiver(s) respond to those test packets. Tests of the transmitter(s) of the DUT (TX tests) are performed by having them send packets to the test system, which may then evaluate various physical characteristics of the signals from the DUT.

Testing of wireless devices, such as WiFi, Bluetooth, Zigbee and Z-Wave devices, has progressed from frequent two-way messaging between a tester and DUT to infrequent messaging between which major portions of test flows are executed within and coordinated between tester and DUT using non-link test solutions where only the unique device identifier and portions of the PHY are active. However, results of such tests would typically have been conveyed from DUT to tester via communications ports and pathways as the upper level of the protocol stack is not active, thereby preventing data from being easily conveyed in the transmitted packets. Therefore, where the only connection between a DUT and tester is either conducted or radiated signal paths and the data exchanged is via data packets, it may be difficult, if possible at all, for a DUT to convey test results to a tester using non-link test methods. As discussed in more detail below, in accordance with exemplary embodiments of the presently claimed invention, testing of a RF data packet transceiver can be performed, at least in part, by testing at lower layers of the network data packet signal communications protocol.

The following discussion is presented in a context of using Zigbee devices and their device identifiers in the form of a media access control (MAC) addresses as an example of the unique device identifier. However, it will be readily apparent to one of ordinary skill in the art of wireless data transceivers that such discussion is also applicable for WiFi devices or Bluetooth Low Energy (BTLE) devices for which a Bluetooth address (BD_ADDR) is the device identifier, as well as Z-Wave and other similar devices and their respective forms of device identifiers.

As discussed in more detail below, to avoid a need for a tester having significantly greater and/or more sophisticated testing resources, and allow for continued use of current testing resources, it is proposed to advantageously use existing capabilities and/or features of devices conforming to standards for carrier-sense multiple access with collision avoidance (CSMA/CA), which has been adopted as part of many of the standards established to prescribe uses of unlicensed radio frequency (RF) signal bands (e.g., WiFi, Bluetooth, ZigBee, etc.) as a channel access mechanism. In accordance with exemplary embodiments, such CSMA/CA conformance may be invoked to initiate and control delays in expected DUT operations, and thereby allow for sufficient processing time for the tester when testing such a DUT. Accordingly, further enabled are uses of more generic testers to implement standard-specific testing without additional or special hardware and/or software for the tester, and thereby enable testing at lower costs.

Figure 4:
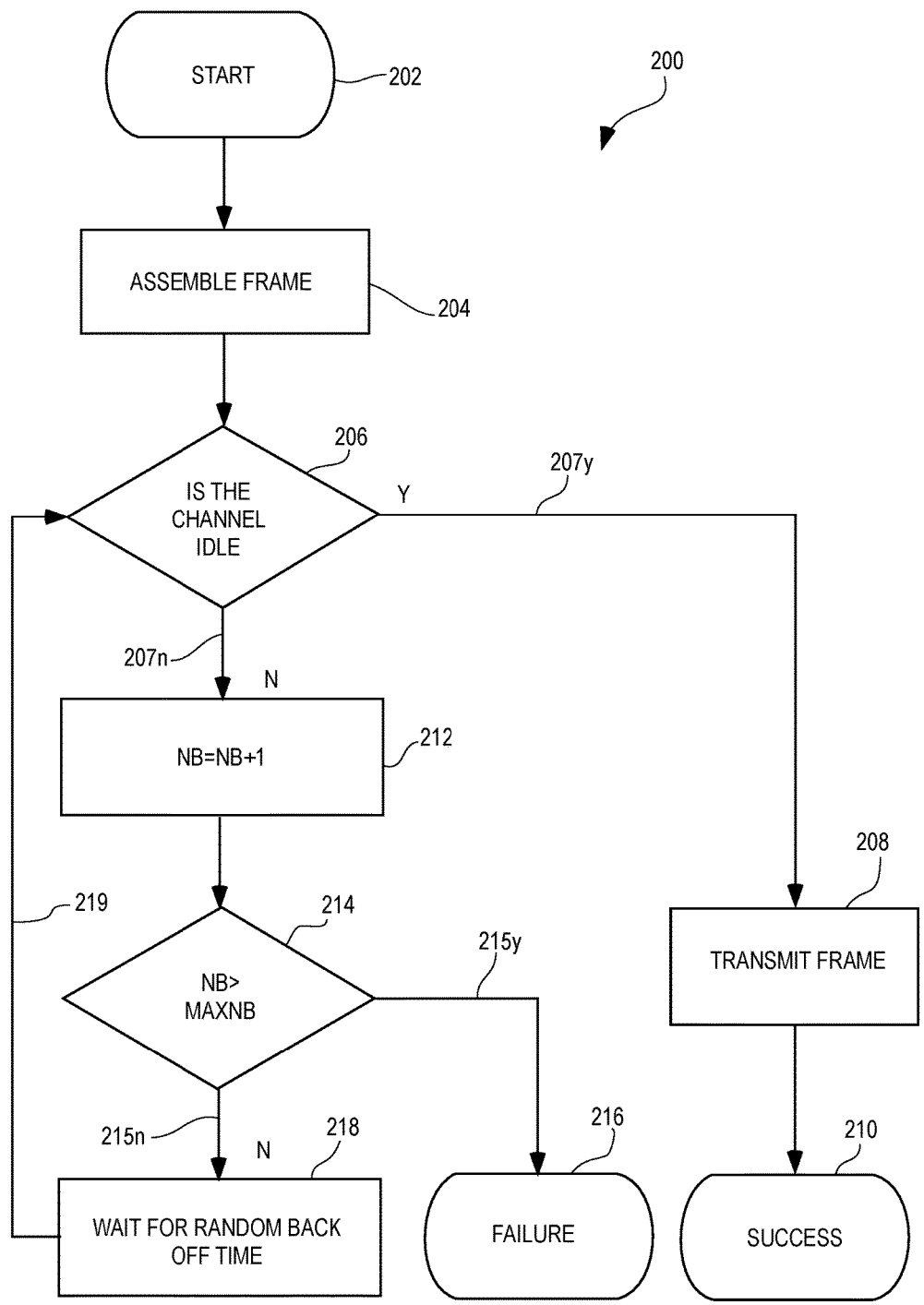
FIG. 4 depicts exemplary steps of a device operating in conformance with carrier-sense multiple access with collision avoidance (CSMA/CA).

Referring to FIG. 4, with CSMA/CA, prior to transmitting, the DUT first listens to the channel to determine whether another device is transmitting or not. If the channel is occupied, it waits for a period time before listening again for a free channel. The DUT only transmits when the channel is free to use. Hence, CSMA/CA is a network multiple access method in which carrier sensing is used, but nodes attempt to avoid collisions by transmitting only when the channel is sensed as being idle, and when they do transmit, nodes transmit their packet data in its entirety.

For example, a data packet transmitter, or node, begins 202 by assembling a frame 204 and then listening to the channel (discussed in more detail below) to determine if the channel is idle 206. If the channel is idle 207y, the frame is transmitted 208 and the transmission is a success 210. If the channel is not idle 207n, the node "backs off" by refraining from transmitting the assembled frame, and a counter identifying the number of backoffs NB is incremented 212. This incremented backoff count NB is then compared to a maximum value maxNB. If the count NB exceeds the maximum maxNB 215y, the transmission is deemed a failure 216. If the count NB does not exceed the maximum maxNB 215n, the node waits for a random backoff time interval before resuming 219 by again listening to the channel to determine if the channel is idle 206.

Figure 5:
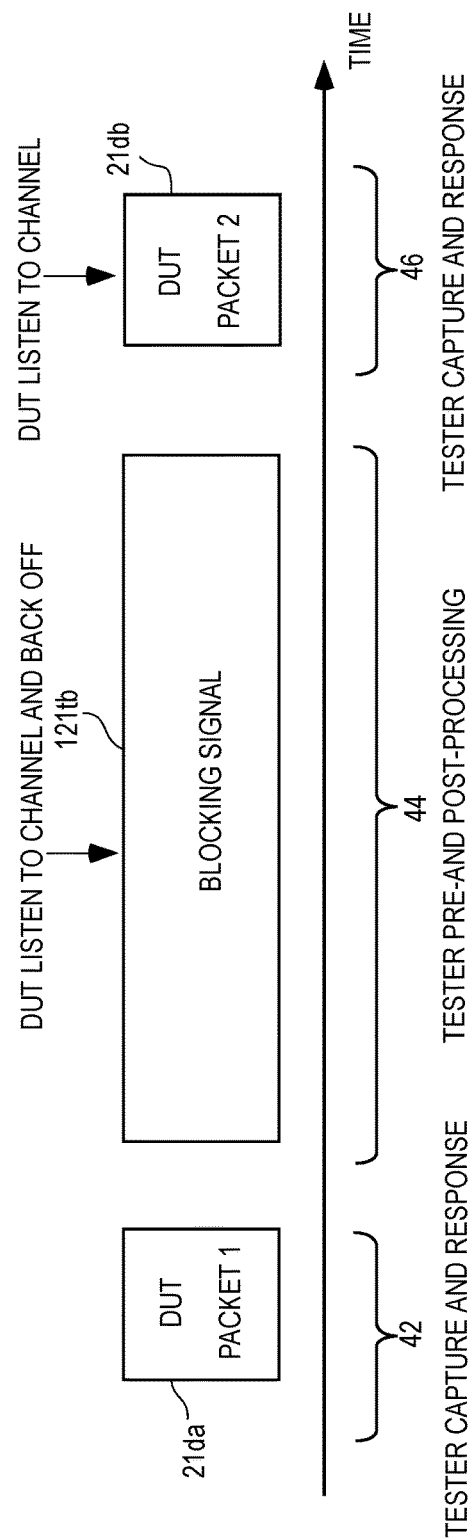
FIG. 5 depicts exemplary relative timing between data packets emitted from a DUT and time intervals during which a tester captures and responds, and effectively blocks use of the communication channel by the DUT during pre- and/or post processing of received data packets.

Referring to FIG. 5, transmissions by the DUT may be effectively delayed by blocking the communication channel between the tester and the DUT during a time interval in which the tester is doing pre- and/or post-processing and/or is otherwise not yet ready to receive further data packets. More particularly, following an initial communication from the tester, the DUT may respond during a subsequent time interval 42 with a packet 21da (e.g., an acknowledgement, or "ACK") for capture and processing (e.g., storage, analysis, etc.) by the tester. Meanwhile, in accordance with proposed methods, as the tester begins operating in a pre- and/or post-processing mode 44 with the received packet 21da, a blocking signal 121tb (discussed in more detail below) is transmitted via the channel and thereby congests the channel. As the DUT then listens to the channel prior to transmitting its next data packet or frame, as discussed above, it senses that the channel is not idle due to the channel congestion resulting from the blocking signal, and refrains from continued or further transmissions. Later, following completion of the pre- and/or post-processing 44, transmission of the blocking signal 121tb is terminated. As the DUT again listens to the channel prior to transmitting its next data packet or frame, as discussed above, it senses that the channel is now idle again, and resumes transmission with another data packet 21db during the next tester capture and response time interval 46 (following which congestion of the channel with another blocking signal may be repeated as desired or necessary to allow time for further pre- and/or post-processing of the received packet 21db).

Figure 2:
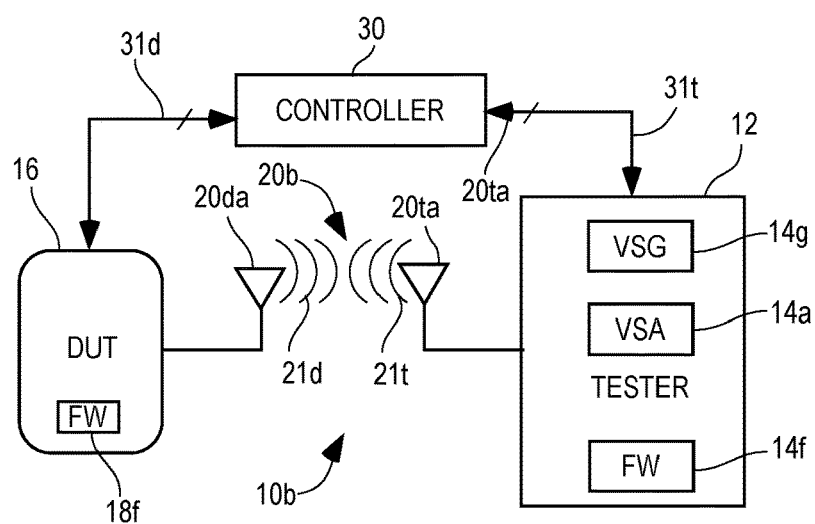
FIG. 2 depicts a typical testing environment for a RF data packet signal transceiver DUT in a radiative, or wireless, environment.
Figure 3:
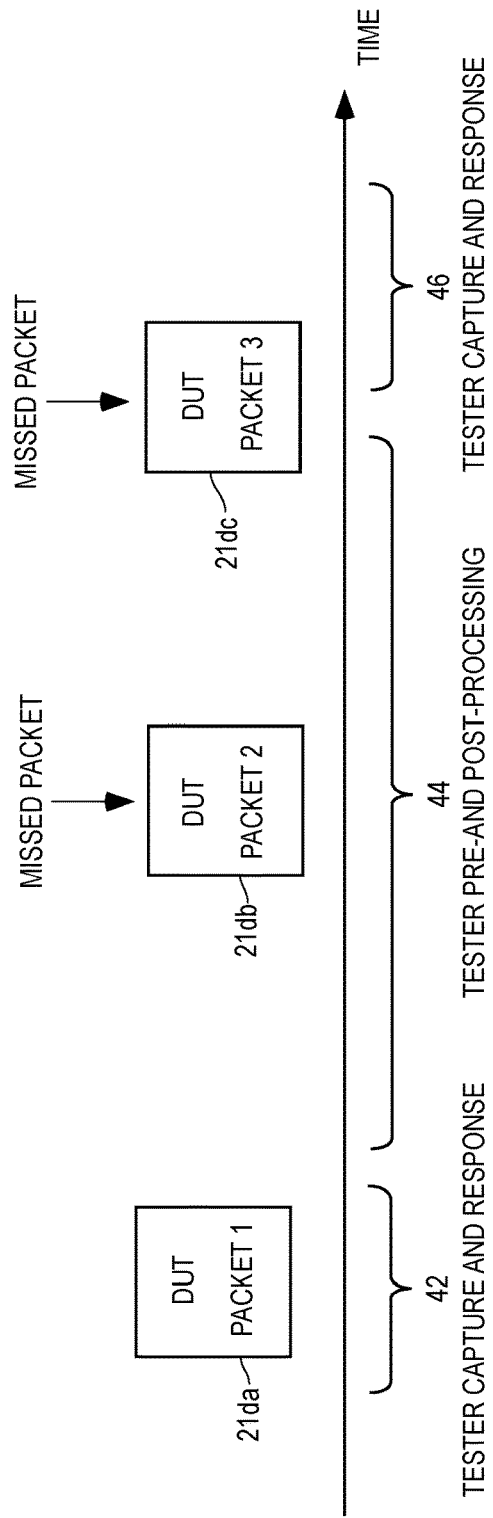
FIG. 3 depicts exemplary relative timing between data packets emitted from a DUT and time intervals during which a tester captures and responds, and performs pre- and/or post processing of received data packets.

The communication channel (e.g., via which the tester 12 and DUT 16 (FIGS. 1-2) communicate and conveyed via a conductive signal path 20a or wireless signal path 20b), may be congested using a blocking signal to thereby cause the channel to appear as not being idle. In other words, while the channel may not necessarily be "busy" or otherwise "occupied" due to conveyance of normal communications, such as conveying frequency-division multiplexed or time-division multiplexed data signals, the channel is nonetheless sufficiently "busy" or otherwise "occupied", or "non-idle", such that any reception of a data packet transmitted by the DUT would likely fail.

The specific nature or form of the blocking signal that can effectively congest the communication channel so as to cause the channel to appear to the DUT as being in use or not idle may depend upon characteristics of the RF interface or other circuitry of the DUT. For example, such a blocking signal may include an otherwise normal data packet signal, but excluding identification data (e.g., a media access control address identifying or otherwise associated with the tester) so as to ensure that that the DUT determines that the source of the signal is another device or node with which the DUT is not to initiate or resume communications. Such a blocking signal may also simply include a carrier, or continuous wave (CW), signal at a frequency within the communication channel, e.g., that normally serving as the nominal center frequency of the normal data packet signal. Alternatively, such a blocking signal may also be a form of noise signal (e.g., "white" or "colored" noise) having a sufficient number of signal frequencies and power levels within the defined frequency band occupied by the normal data packet signal communications between the DUT and tester.

Hence, the proposed method may take advantage of CSMA/CA conformance by the DUT to force the DUT to back off so long as the channel is not idle. This can be controlled by the tester in which its VSG and VSA (or other subsystem(s) performing pre- and post-processing) can operate contemporaneously, or in parallel, thereby enabling the tester to perform or control pre- and/or post-processing while the VSG (or another transmitted controlled by the tester) is causing the channel to appear as not being idle, e.g., by congesting or otherwise occupying the channel with data or signals to which the DUT does not react or respond (discussed in more detail below). Then, when the tester becomes ready for reception of more data packets, it "releases" the channel (e.g., by terminating its use or occupation of the channel), to which the DUT responds by accessing and transmitting via the channel. The maximum time available for delays initiated by the tester in such manner depends on the maximum number of retry attempts or times defined in specific stacks and represented by the maximum number of backoffs maxNB, as discussed above.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing a data packet signal transceiver device under test (DUT), comprising:
    receiving, via a communication channel, a DUT data packet signal from a DUT;
    responding to said DUT data packet signal by transmitting, via said communication channel, a test data packet signal including first identification data related to said test data packet signal;
    following said responding, further transmitting, via said communication channel, at least one of
        said test data packet signal, or
        a channel signal excluding said first identification data and congesting at least a portion of said communication channel;
    concurrently with at least a portion of said further transmitting, processing said received DUT data packet signal; and
    terminating said further transmitting.

2. The method of claim 1, wherein:
    said DUT data packet signal comprises a nominal carrier signal frequency within said communication channel; and
    said channel signal comprises said nominal carrier signal frequency.

3. The method of claim 1, wherein:
    said DUT data packet signal comprises a plurality of signal frequencies within said communication channel; and
    said channel signal comprises at least a portion of said plurality of signal frequencies.

4. The method of claim 1, wherein:
    said DUT data packet signal comprises at least a portion of a plurality of signal frequencies; and
    said channel signal comprises said plurality of signal frequencies within said communication channel.

5. The method of claim 1, wherein said channel signal comprises another test data packet signal including second identification data different from said first identification data.

6. A method for testing a data packet signal transceiver device under test (DUT), comprising:
    receiving, via a communication channel, a DUT data packet signal from a DUT;
    responding to said DUT data packet signal by transmitting, via said communication channel, a test data packet signal including first identification data related to said test data packet signal;
    processing said received DUT data packet signal while at least partially concurrently further transmitting, via said communication channel, at least one of
        said test data packet signal, or
        a channel signal excluding said first identification data and congesting at least a portion of said communication channel; and
    terminating said further transmitting.

7. The method of claim 6, wherein:
    said DUT data packet signal comprises a nominal carrier signal frequency within said communication channel; and
    said channel signal comprises said nominal carrier signal frequency.

8. The method of claim 6, wherein:
    said DUT data packet signal comprises a plurality of signal frequencies within said communication channel; and
    said channel signal comprises at least a portion of said plurality of signal frequencies.

9. The method of claim 6, wherein:
    said DUT data packet signal comprises at least a portion of a plurality of signal frequencies; and
    said channel signal comprises said plurality of signal frequencies within said communication channel.

10. The method of claim 6, wherein said channel signal comprises another test data packet signal including second identification data different from said first identification data.

11. A method for testing a data packet signal transceiver device under test (DUT), comprising:
conveying during each one of a first plurality of time intervals, via a communication channel, a respective one of a plurality of DUT data packet signals from a DUT;
conveying during each one of a second plurality of time intervals, via said communication channel, a respective one of a plurality of test data packet signals responsive to a corresponding one of said plurality of DUT data packet signals and including first identification data related to at least a portion of said plurality of test data packet signals; and
during each one of a third plurality of time intervals, processing a respective one of said plurality of DUT data packet signals while at least partially concurrently further conveying, via said communication channel, at least one of
said test data packet signal, or
a respective one of a plurality of channel signals excluding said first identification data and congesting at least a portion of said communication channel;
wherein
each one of said second plurality of time intervals follows a respective one of said first plurality of time intervals,
each one of said third plurality of time intervals follows a respective one of said second plurality of time intervals, and
each one of at least a portion of said third plurality of time intervals is followed by a subsequent respective one of said first plurality of time intervals.

12. The method of claim 11, wherein:
each one of said plurality of DUT data packet signals comprises a nominal carrier signal frequency within said communication channel; and
each one of said plurality of channel signals comprises said nominal carrier signal frequency.

13. The method of claim 11, wherein:
each one of said plurality of DUT data packet signals comprises a plurality of signal frequencies within said communication channel; and
each one of said plurality of channel signals comprises at least a portion of said plurality of signal frequencies.

14. The method of claim 11, wherein:
each one of said plurality of DUT data packet signals comprises at least a portion of a plurality of signal frequencies; and
each one of said plurality of channel signals comprises said plurality of signal frequencies within said communication channel.

15. The method of claim 11, wherein each one of said plurality of channel signals comprises another test data packet signal including second identification data different from said first identification data.

* * * * *